Nov. 3, 1931.    J. J. SANTIAGO    1,829,760
FISHING TOOL
Filed Dec. 5, 1928

Inventor.
James J. Santiago.

Attorney.

Patented Nov. 3, 1931

1,829,760

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

FISHING TOOL

Application filed December 5, 1928. Serial No. 323,843.

This invention has to do with fishing tools of the variety designed and adapted for picking up objects that are more or less tubular or cylindric in shape, such as pipe, drill pipe, drill stems, drilling tools, etc.; and a general object of the invention is to provide an effective fishing tool of a simple character which may be easily applied to the fish, which will effectively take hold, and which may be easily released from its hold in case it is found undesirable or impracticable to pull the fish.

In satisfying these objects the invention takes the form of a slip carrier in which a set of slip or wedge members, preferably in the form of balls, operate in such fashion as to grip the fish and wedge tightly upon it when the slip or wedge carrying member is moved upwardly. Associated with this carrying member is a combined anchor and wedge raiser which, by screw thread action resultant upon rotation of the fishing pipe, lifts the wedges to release them from the fish when desired.

Figure 1:
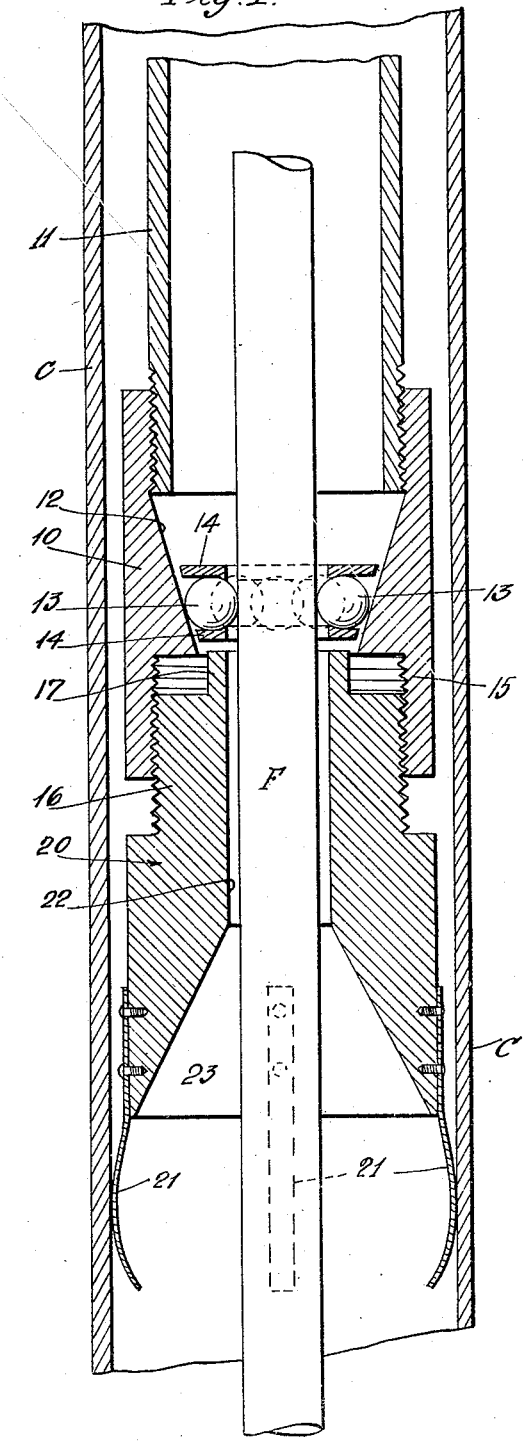
Figure 2:
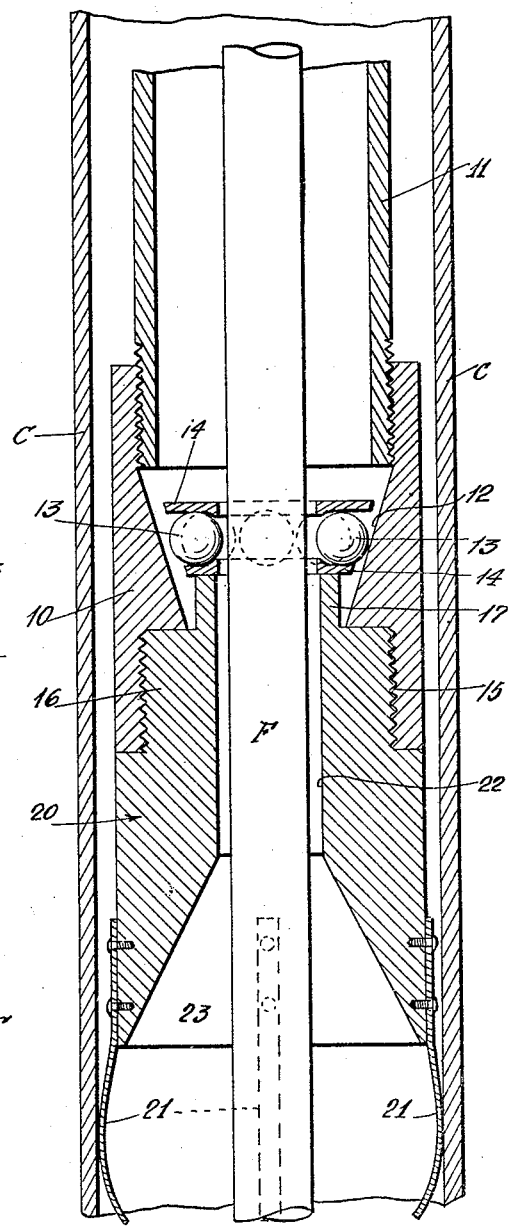

The whole mechanism is exceptionally simple, but is capable of specific design in a variety of forms, as will be well understood by those skilled in the art after reading the following detailed specification which describes a specific and illustrative form of the device. In connection with such description reference is had to the accompanying drawings in which Figure 1 is a central vertical section showing the fishing tool in its operative position to lift such a member as a piece of pipe or drill stem and Fig. 2 is a similar view showing the fishing tool releasing from the fish.

In the drawings I show at 10 a wedge carrying member attached at its upper end to the lower end of the fishing pipe or tubing 11. This pipe or tubing 11 extends to the top of the well and is the means or member through which the fishing tool is operated.

The carrier member 10 has an interior tapering or conical bore 12 of suitable size and suitable taper angle. Within this bore I place a plurality of slip or wedge members, here shown as comprising a plurality of balls 13. Although any desired number of said balls may be used, I prefer to utilize such a number as will substantially or nearly fill the circle occupied by the balls when they are in their lowermost and contracted position such as shown in Figure 1. To prevent the balls dropping out of the carrier I preferably mount the balls loosely in a cage 14. Any suitable kind of ball cage may be used, it only being necessary that the cage hold the balls loosely and allow a certain latitude of radial movement to and from the vertical central axis of the whole device. Such ball cages are well known and will need no particular description.

Below the tapered conical bore 12 the carrier 10 is provided with a screw-threaded socket or box 15 adapted to take the screw-threaded pin 16 of the combined anchor and wedge lifter 20 about to be described. This combined anchor and wedge lifter has at its upper end a projecting annular rib or flange 17 adapted to enter the lower smaller end of the conical bore 12 and to engage with and lift the ball cage and balls, as will be readily understood from a comparison of Figure 1 and Figure 2. The screw threads 15 are preferably right handed, so that right handed rotation of the fishing pipe 11 will screw the carrier 10 relatively downwardly onto the anchor member, or screw the anchor member relatively upwardly into the carrier, to reach the relative position shown in Figure 2.

The anchor member, designated by the numeral 20, has at its lower end a plurality of friction of drag springs 21 adapted resiliently to engage the inside of the well casing C or, its equivalent, the wall of the hole. These springs are of such form and of such resilient stiffness that they do not materially impede the movement of the fishing tool up and down in the well, but at the same time engage the casing or the wall with sufficient pressure to act as an effective rotary drag upon the anchor 20 to keep the anchor from turning, or at least from turning readily. Right handed rotation of fishing pipe 11 and carrier 10 will thus cause the screw thread action that moves the parts from the position of Figure 1 to the position of Figure 2. The anchor 20 has a longitudinal bore 22 large enough to pass the fish F but of such diameter, relative to the internal circle of the ball assembly, as always to guide the upper end of the fish into that internal circle of the ball assembly. And the lower end of anchor 20 has a conical mouth 23 to guide the anchor over the upper end of the fish, as the fish may not always or usually be standing centrally or exactly vertically in the well.

From what has been described it will be readily understood that the fishing tool must, of course, be of proper size and proportions to operate upon and pick up a fish of any specific size. While the balls 13 have a certain amount of radial expansive movement between the position of Figure 1 and the position of Figure 2, and therefore any given fishing tool has a certain amount of latitude as regards the diameter of fish upon which it will effectively operate, beyond the limits of that latitude the size of the fishing tool, and its various parts, must be selected for the particular size of fish in question.

In using the fishing tool, it is lowered in the well with the parts in the relative positions illustrated in Figure 1; that is, the anchor 20 is in a position sufficiently low that the wedging balls 13 may fall to their lowermost contracted position in the tapered bore 12. As the fishing tool passes down the well the lower flaring mouth 23 of the anchor will pass over the upper end of the fish and thus guide the upper end of the fish into the anchor bore 22 and thence upwardly within the circle of balls 13. The balls may be pushed up somewhat toward the position of Figure 2, by reason of engagement with the fish; but when the fishing tool is stopped and then subsequently pulled upwardly, the balls settle down into gripping position around the fish, frictionally engaging the fish and also frictionally engaging the conical bore 12 so that they cannot rotate. The ball is usually of relatively hard steel, harder than the steel or other metal of the fish and the steel or other metal of carrier 10. So that the wedging action of the balls causes them more or less to bite or sink into the fish and the conical wall 12, thus increasing the frictional holding action. The balls therefore grip the fish tightly and the fish may usually be pulled by then hoisting on the fishing pipe 11.

If, however, it is found impossible or undesirable for any reason to pull the fish when it has been gripped, the tool may easily be released by turning the fishing pipe 11 right handedly. This right handed rotation may be facilitated by lowering the fishing pipe 11 a little so as to relieve the heavy wedging effect of the balls and so that the balls may then roll easily around the fish. Then continued rotation of the fishing pipe will either screw the anchor up to the position of Figure 2 and raise the balls to their upper inoperative position; or the fishing pipe 11 may be lowered as it is rotated right handedly so that the carrier 10 is lowered somewhat as it is rotated, thus facilitating the release of the fish by the balls as the parts are put into the relative position of Figure 2. When once the parts have been put into the relative position of Figure 2 the fishing tool may be lifted over the fish and out of the hole if so desired; or another grip may be taken upon the fish at another point in its length.

I claim:

1. A fishing tool of the character described, comprising a wedge carrying member adapted for connection at its upper end with a fishing pipe or the like, said member having therein a downwardly tapering bore, a plurality of wedge members movable vertically and laterally along the wall of said tapering bore, means for retaining the wedge members within said carrying member, and a tubular anchor member provided with means for frictionally engaging the wall of the bore hole, screw threadedly connected at its upper end to the lower end of the carrier, and having a wedge member supporting part adapted to project upwardly into the lower end of said tapering bore.

2. A fishing tool of the character described, comprising a wedge carrying member adapted for connection at its upper end with a fishing pipe or the like, said member having therein a downwardly tapering bore, a plurality of wedge members movable vertically and laterally along the wall of said tapering bore, means for retaining the wedge members within said carrying member, and a tubular anchor member provided with means for frictionally engaging the wall of the bore hole, screw threadedly connected at its upper end to the lower end of the carrier, and having a wedge member supporting part adapted to project upwardly into the lower end of said tapering bore, said anchor member having a downwardly flaring mouth at its lower end and its bore above the flaring mouth being of such a size as to guide a fish into the space within the wedge members.

3. A fishing tool of the character described, comprising a wedge carrying member adapted for connection at its upper end with a fishing pipe or the like, said member having therein a downwardly tapering bore, a plurality of wedge members movable vertically and laterally along the wall of said tapering bore, said wedge members comprising a circular formation of balls, means for retaining the wedge members within said carrying member, and a tubular anchor member provided with means for frictionally engaging the wall of the bore hole, screw threadedly connected at its upper end to the lower end of the carrier, and having a wedge member supporting part adapted to project upwardly into the lower end of said tapering bore.

4. A fishing tool of the character described, comprising a wedge carrying member adapted for connection at its upper end with a fishing pipe or the like, said member having therein a downwardly tapering bore, a plurality of wedge members movable vertically and laterally along the wall of said tapering bore, said wedge members comprising a circular formation of balls, a cage adapted loosely to hold said circular formation of balls, and a tubular anchor member provided with means for frictionally engaging the wall of the bore hole, screw threadedly connected at its upper end to the lower end of the carrier, and having a part adapted to project upwardly into the lower end of said tapering bore.

5. A fishing tool of the character described, comprising a wedge carrying member adapted for connection at its upper end with a fishing pipe or the like, said member having therein a downwardly tapering bore, a plurality of wedge members movable vertically and laterally along the wall of said tapering bore, said wedge members comprising a circular formation of balls, means for retaining the wedge members within said carrying member, and a tubular anchor member provided with means for frictionally engaging the wall of the bore hole, screw threadedly connected at its upper end to the lower end of the carrier, and having a wedge member supporting part adapted to project upwardly into the lower end of said tapering bore, said anchor member having a downwardly flaring mouth at its lower end and its bore above the flaring mouth being of such a size as to guide a fish into the space within the circular ball formation.

6. A fishing tool of the character described, comprising a wedge carrying member adapted for connection at its upper end with a fishing pipe or the like, said member having therein a downwardly tapering bore, a plurality of wedge members movable vertically and laterally along the wall of said tapering bore, said wedge members comprising a circular formation of balls, a cage adapted loosely to hold said circular formation of balls, and a tubular anchor member provided with means for frictionally engaging the wall of the bore hole, screw threadedly connected at its upper end to the lower end of the carrier, and having a part adapted to project upwardly into the lower end of said tapering bore, said anchor member having a downwardly flaring mouth at its lower end and its bore above the flaring mouth being of such a size as to guide a fish into the space within the circular ball formation.

7. A fishing tool of the character described, comprising a wedge carrying member adapted at its upper end for connection with a fishing pipe or the like, said member having an interior downwardly tapering conical bore and having, below the bore and open to its lower end, a screw threaded socket, a wedging assembly located in the conical bore and including a circular arrangement of hard metal balls and a cage loosely holding the balls to allow them both vertical movement and radial movement in and out, a tubular anchor member having at its upper end a screw threaded pin engaging screw-threadedly into the screw threaded socket of the carrier, an upwardly extending annular flange on the upper end of the screw threaded pin adapted to project upwardly into the lower end of the conical bore when the screw threaded pin of the anchor member is screwed up into said socket, resilient friction members carried on the anchor member and adapted resiliently to engage the wall of a drill hole and thereby to create a rotary drag on the anchor member, the anchor member having a downwardly flaring mouth at its lower end and the bore of the anchor member above the mouth being of such size as to guide the upper end of a fish into the circle surrounded by said balls.

8. In a fishing tool of the character described, a body comprising two relatively rotatable tubular members, one of said members containing a plurality of vertically movable pipe encircling wedge elements, means for retaining said wedge elements within the last mentioned member, means associated with the other member for frictionally engaging the well bore wall, and means for moving said wedge elements vertically by virtue of relative rotational movement between said body members.

9. In a fishing tool of the character described, a body comprising upper and lower relatively rotatable tubular members, said upper member having therein a downwardly tapering bore, a plurality of vertically movable pipe encircling wedge elements in said bore, means for retaining said wedge elements within the last mentioned member, and means associated with said lower body member for engaging and moving said wedge elements vertically by virtue of relative rotational movement between said body members.

10. In a well fishing tool of the character described, a body comprising two relatively movable members, one of said members containing a plurality of vertically movable pipe encircling wedge elements, means for retaining said wedge elements within the last mentioned member, means associated with the other member for frictionally engaging the well bore wall, and means for moving said wedge elements vertically by virtue of relative rotational movement between said members.

In witness that I claim the foregoing I have hereunto subscribed my name this 27 day of November, 1928.

JAMES J. SANTIAGO.